Figure 1:
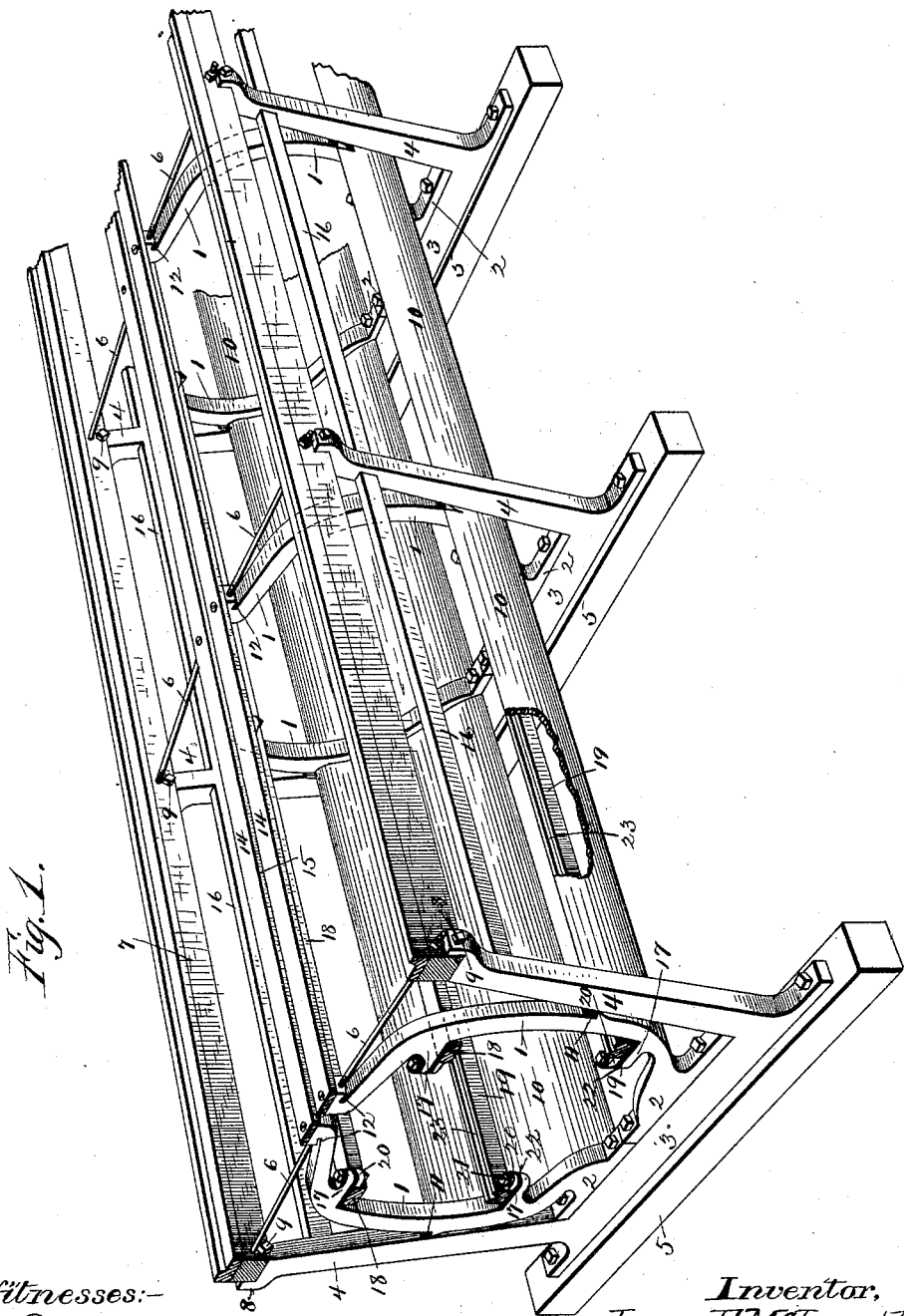

(No Model.) 5 Sheets—Sheet 1.
J. F. McLAUGHLIN.
MEANS FOR ELECTRIC LOCOMOTION.

No. 432,204. Patented July 15, 1890.

Witnesses:—
Percy C. Bowen
F. T. Chapman

Inventor,
James F. McLaughlin,
By Joseph Lyons,
Attorney.

THE NORRIS PETERS CO., PHOTO-LITHO., WASHINGTON, D. C.

(No Model.) 5 Sheets—Sheet 2.

J. F. McLAUGHLIN.
MEANS FOR ELECTRIC LOCOMOTION.

No. 432,204. Patented July 15, 1890.

Witnesses:—
Percy C. Bowen
F. T. Chapman

Inventor,
James F. McLaughlin,
By Joseph Lyons,
Attorney.

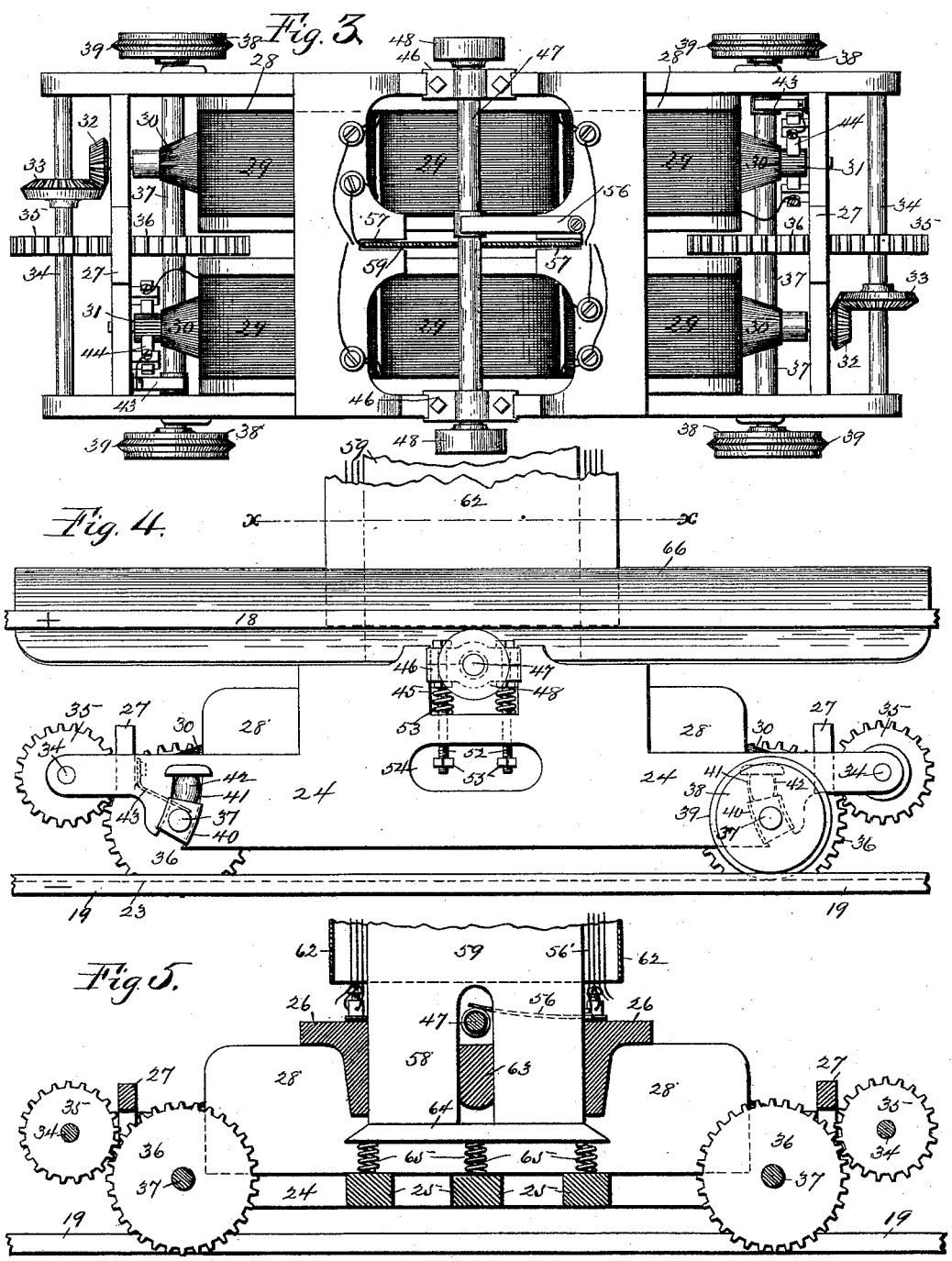

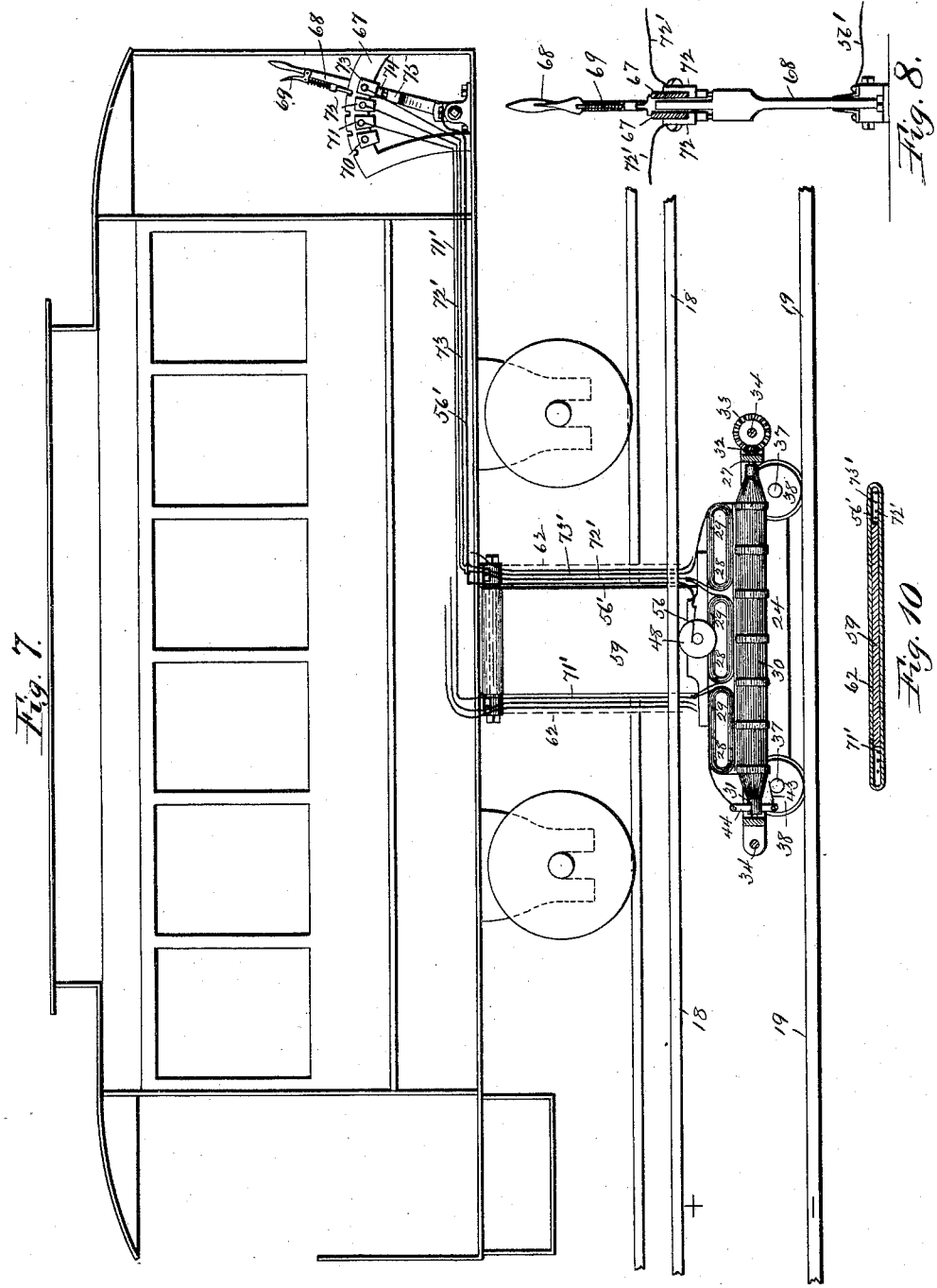

(No Model.) 5 Sheets—Sheet 5.
J. F. McLAUGHLIN.
MEANS FOR ELECTRIC LOCOMOTION.
No. 432,204. Patented July 15, 1890
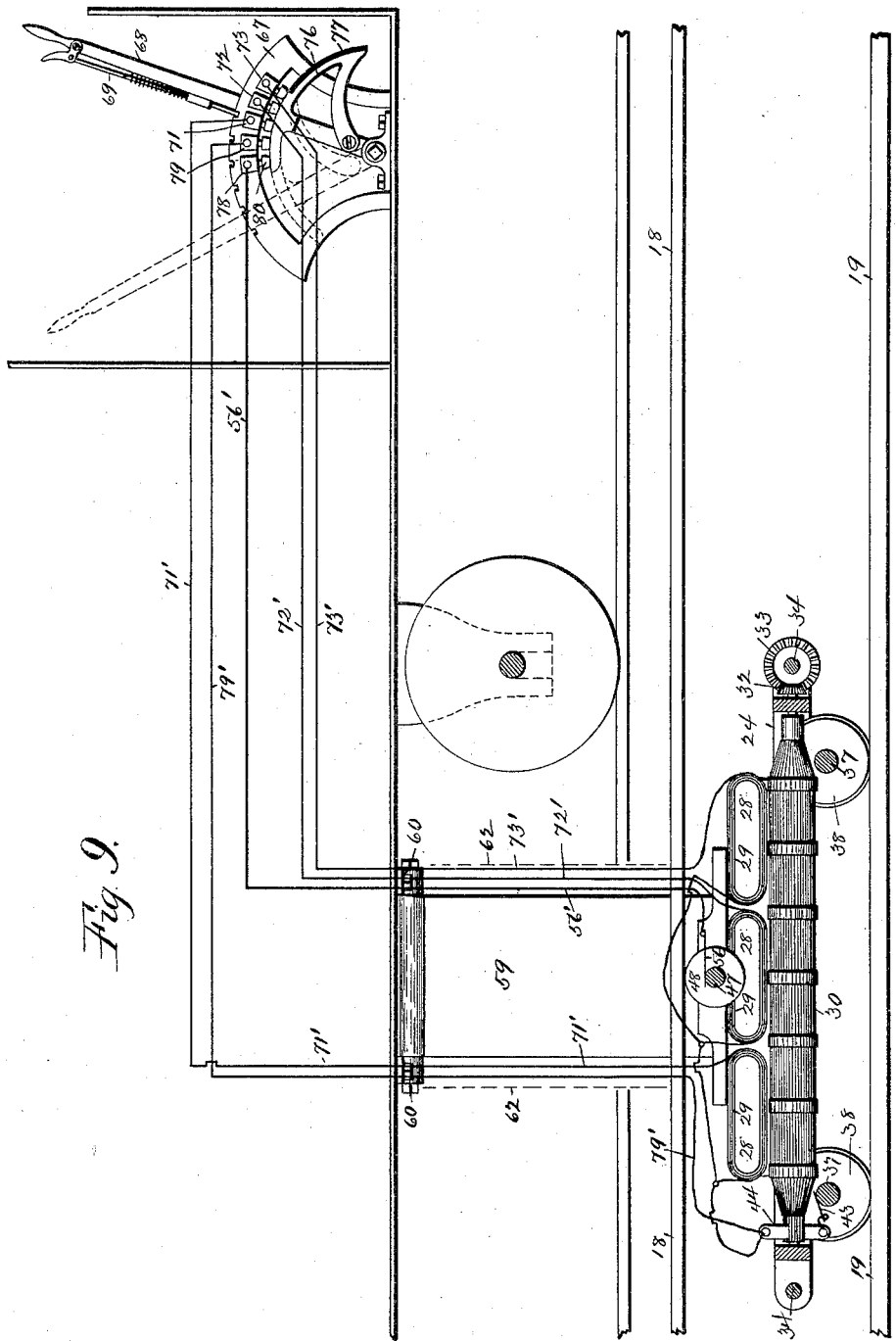
Witnesses:
Percy C. Bowen
F. T. Chapman
Inventor,
James F. McLaughlin,
By Joseph Lyons,
Attorney.

UNITED STATES PATENT OFFICE.

JAMES F. McLAUGHLIN, OF PHILADELPHIA, PENNSYLVANIA.

MEANS FOR ELECTRIC LOCOMOTION.

SPECIFICATION forming part of Letters Patent No. 432,204, dated July 15, 1890.

Application filed January 30, 1890. Serial No. 338,560. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Means for Electric Locomotion, of which the following is a specification.

This invention has reference to improvements in means for electric locomotion; and it consists in an electric motor traveling within a properly-constructed conduit and mechanically connected to a surface-car to be driven thereby as distinguished from an electric motor carried on the car which is to be propelled.

In carrying out my improvements I provide a conduit with two pairs of conductors, each of which constitutes tracks on which travel the wheels of a truck containing one or more electric motors, and these wheels are so arranged that they are forced into strong frictional contact with the conductor-tracks, so that a good traction is obtained as well as good electrical contact. This motor-truck is connected with the surface-car to be driven by an arm extending upward through the slot usually provided in underground conduits for electric railways, and conductors connected to the motor or motors are also carried to the car to be driven, and suitable switches are provided, so that a greater or less amount of the power may be utilized and the motor may be started or stopped at will. The motor-truck is also so connected to the car to be driven that the weight of the car is in a measure borne by the said motor-truck, and the traction of the latter on the conductor-trucks is thereby increased, while provision is made for the slight vertical vibrations of the car to be driven when in motion.

In the accompanying drawings, forming part of this specification, is illustrated a practical embodiment of the invention; but it is to be distinctly understood that I am by no means confined to such identical structures or arrangement of parts as therein shown, since various structures may be employed in place of those shown without departing from the spirit of the invention.

Figure 2:
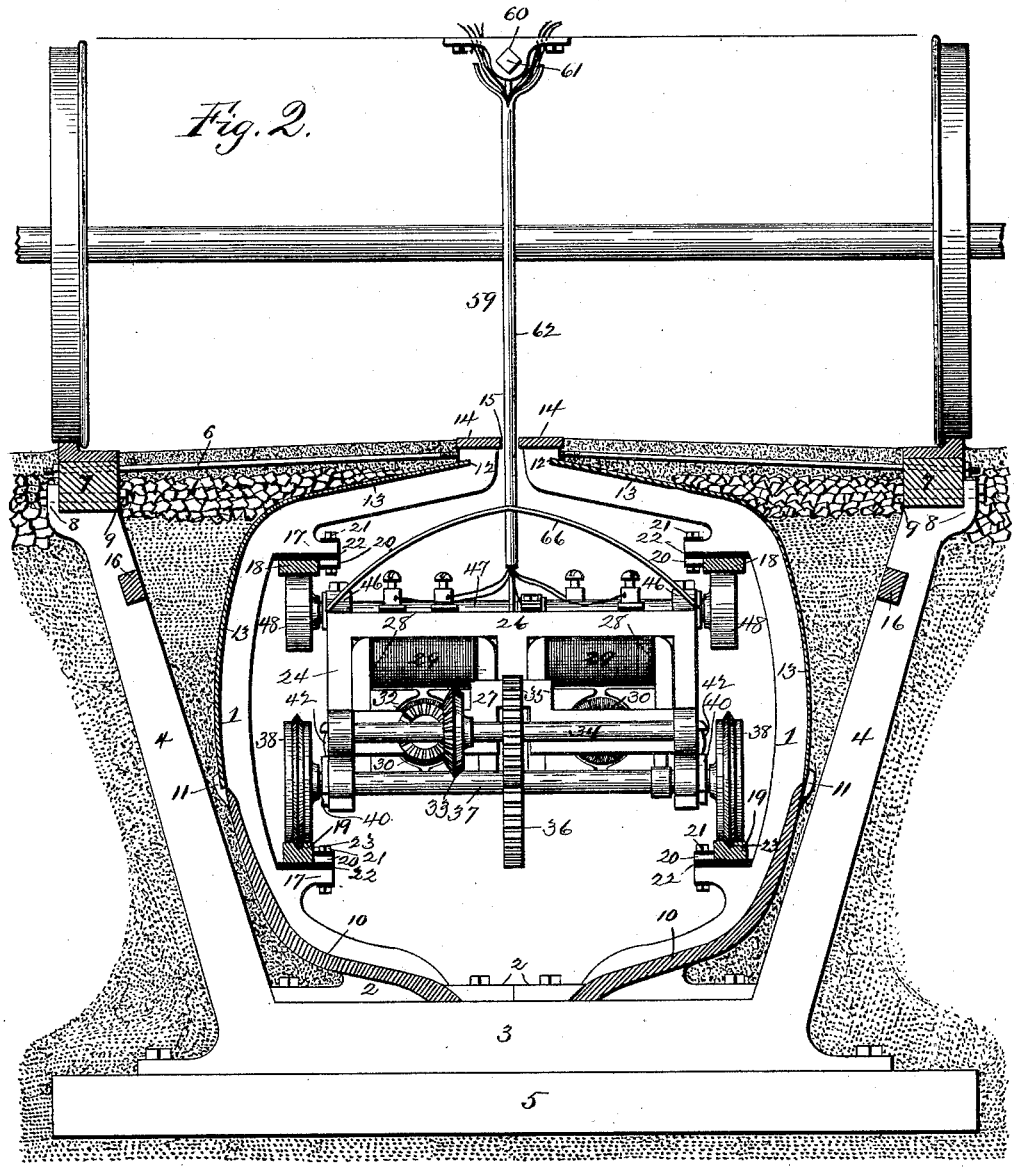
Figure 6:
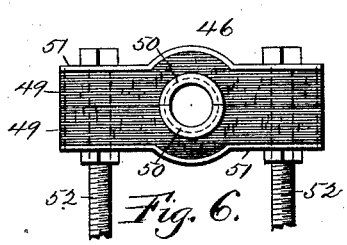

In the drawings, Figure 1 is a perspective view of a portion of a conduit constructed in accordance with my invention, parts being removed to expose the interior thereof. Fig. 2 is a vertical cross-section of the conduit in position in a road-bed, and showing the motor-truck in end elevation and so much of the car to be driven as is necessary to show the connections between the truck and car. Fig. 3 is a plan view of the electric-motor truck with the arm connecting it to the car in horizontal section and with the protecting-shield removed. Fig. 4 is a side elevation of the motor-truck in position on the conductor-rails, one of the supporting-wheels being removed and the arm connecting the truck and car to be driven being broken away. Fig. 5 is a vertical longitudinal section of the motor-truck. Fig. 6 is a detail view illustrating one of the journal-boxes for the axle of the upper contact-wheels. Fig. 7 is a partially-diagrammatic view illustrating the car, the motor connected thereto, the relative arrangement of the conductor-tracks, and the switch on the car with its connections to the motor. Fig. 8 is a vertical sectional elevation of the switch. Fig. 9 is a partially-diagrammatic view similar to Fig. 7, but on a larger scale, illustrating another mode of connecting the switch and motor; and Fig. 10 is a cross-section of the arm connecting the motor and car, taken on the line *x x* of Fig. 4.

Referring now more particularly to Figs. 1 and 2, there is shown a conduit in general construction somewhat similar to that described in an application filed by me on December 27, 1889, Serial No. 335,126, for improvement in electric railways. There are pairs of curved ribs 1 at intervals on opposite sides of the conduit, each rib terminating at the lower end in a foot 2, which is bolted or otherwise secured to a base 3, at the ends of which are formed upwardly-extending diverging posts 4, which are cast integral with the base. This casting is bolted to a tie 5, laid in the bottom of a trench formed for the purpose in the roadway. The upper ends of the arms 1 approach close to each other, but do not touch, and into each end is screwed one end of a straining-rod 6, the other end of which is secured to a track-sleeper 7, seated on the upper ends of the posts 4 against short angle-extensions 8 on these posts, the said sleepers being firmly secured in their seats by bolts 9, extending through the sleepers and angle-extensions 8. A number of the ribs 1 on each side of the conduit are joined by webs 10, formed integral therewith in such manner as to form sections, which are placed one opposite the other in the trench, so that the webs constitute the lower walls of the conduit. On the outer side of each rib at the upper edge of the web is formed a lip 11, and at the outer edge of the upper end of each rib is formed a recess 12, and these lips 11 and recesses 12, when the conduit-sections are assembled in the trench, receive the edges of metal plates 13, sprung into them, and which constitute the remaining portions of the walls of the conduit. On the upper ends of the ribs 1 are secured flat metallic strips 14, placed at such a distance apart that their adjacent edges form the walls of the conduit-slot 15.

In order to insure greater rigidity, the posts 4 are joined near their upper ends by bars 16, which may be cast integral with them. Each rib 1 has cast in it near its upper and lower ends inwardly-projecting brackets 17, one bracket being directly over the other, and to these brackets are secured the conductor-rails 18 and 19, the conductor-rails 18 being secured to the upper brackets on each side of the conduit and the conductor-rails 19 being secured to the lower brackets on each side of the conduit, both sets of rails having lugs 20 projecting from one side of them, and through which extend bolts 21, which also pass through the brackets 17 and secure the rails firmly thereto. Suitable insulating material 22 is interposed between the rails and brackets, and the bolts 21 are also insulated. The upper rails 18 are preferably rectangular in cross-section, and each has a flat lower bearing-surface. The under rails 19 are likewise rectangular in cross-section and each has a flat upper bearing-surface broken by a longitudinal groove 23. In operation the conductor-rails 18 are connected in multiple and constitute one branch of the circuit, while the rails 19 are also connected in multiple and constitute the other branch of the circuit. This is not shown in the drawings, but is readily understood without illustration.

When the conduit has been assembled, as described, the trench is filled with concrete, rubble, or other suitable material, which embraces the posts 4 and sleepers 7 and surrounds the conduit, as shown in Fig. 2.

It will be noticed that the ribs 1 1, together with the metal sheets 13, sprung into seats in the same, being quite free from the webs 10 upward, are elastic enough to yield to lateral pressure or tension. Such pressure or tension is produced by the weight of the surface-car, which tends to spread the surface-rails supported by the sleepers 7, and the effect of this is that the straining-rods 6 tend to separate the slot-plates 14, whereby the slot is prevented from closing, as is sometimes the case with conduits differently constructed.

Referring now to the remaining figures of drawings, taken in connection with Fig. 2, there is shown a truck-frame consisting of the sides 24, connected at the lower edge near the middle by cross-bars 25, and above the latter by other cross-bars 26, and at the ends by cross-bars 27, thus forming a strong and rigid frame for the reception of the motors and driving-gear. In the present instance there are shown two electric motors, which, as will hereinafter appear, may be used either singly or conjunctively. As shown, each motor has a field-magnet 28, with coils divided into three sections 29, one or more of which may be used in a manner to be explained. Each motor has its armature 30 extending in the field produced by the coil-sections and is journaled at the ends in the cross-bars 27 of the frame. At one end each armature carries a commutator 31, and at the other end a bevel-pinion 32, which meshes with a bevel-gear 33, mounted on a counter-shaft 34, journaled in the ends of the sides 24 of the motor-frame and carrying a pinion 35, which in turn meshes with a gear 36 on the axle 37, the latter carrying the drive-wheels 38 at its outer ends. These wheels 38 are each provided with a central peripheral flange 39, which travels in the groove 23 of the conductor-rail 19, the said wheel having ledges or treads on each side of the said flange traveling on the flat face of the said conductor 19.

It will be understood that the intermediate reducing-gear between the armature and the drive-wheel axle is the same at each end of the motor, there being two sets of drive-wheels 38 and two electric motors—one for each set of drive-wheels. The axles 37 are mounted at the ends in suitable axle-boxes 40, which move in guide-slots 41 in the sides 24 of the motor-frame and bear against spring-cushions 42, of rubber or metal, contained in said guide-slots, and in order to insure a suitable engagement of the pinion 35 and gear 36 whatever the position of the axle in the guide-slot 41 may be the latter is curved in an arc of which the axis of the counter-shaft 34 is the center.

Secured to and insulated from each cross-bar 27 is a contact-brush 43, which bears on the axle 37 and is connected to one brush 44 of the commutator 31, the other brush being connected with the coils 29 of the field-magnet, as shown.

At the center of the upper edge of the side pieces 24 of the frame there is a vertical guide-slot 45, in which is fitted a journal-box 46, carrying an axle 47, on the outer ends of which are contact-wheels 48, arranged to travel on the under surface of the conductor-rails 18. This journal-box is composed of two blocks 49 of insulating material, as shown in Fig. 6, each of which carries at its center a half-sleeve 50, of metal, which, when the two halves of the journal-box are together, form an insulated bearing for the axle 47. The upper and lower faces of this journal-box are protected by strengthening-plates 51, and through the two halves 49 and also through the strengthening-plates extend the upper ends of screw-threaded rods 52, one near each end of the journal-box, the said halves 49 being held firmly together by suitable nuts. The rods 52 are surrounded by powerful helical springs 53 between the journal-box and the bottom of the guide-slot 45, through which these rods extend, and they also project downward into an opening 54, formed in the sides 24 of the frame, below the guide-slot 45, and they there receive nuts 55, the purpose of which is to permit a limited vertical movement of the journal-box 46 and rods 52 and to prevent the said journal-box from being accidentally lifted from the said guide-slot. It will be observed that the springs 53 tend to force the contact-wheels 48 strongly against the conductor-rails 18, thus insuring good electrical contact therewith, and at the same time these springs react against the frame of the motor-truck and tend to force the drive-wheels 38 into intimate electrical and frictional contact with the conductor-rails 19.

Secured to but insulated from one of the cross-bars 26 is a contact-brush 56, which bears on the axle 47, and to which is secured a conductor 56', hereinafter referred to. Centrally in the inner faces of each cross-bar 26 there is formed a slot 57, and these slots receive and guide the lower end 58 of an arm 59, composed of a wide and thin steel plate which extends upward through the conduit-slot 15 and at its upper end is pivoted between brackets 60 on the car, the said upper end being formed into an eye, through which passes a bolt 61, securing it to the said brackets in such manner that the car may rock laterally without bending or distorting the said arm.

From a point immediately above the frame of the motor and extending up to the hinged connection with the car, the arm 59 is embraced by a sheathing 62, of sheet metal or other suitable material, which also extends laterally beyond the edges of the arm, as clearly shown in Fig. 10 and in other figures, and the spaces thus formed are filled with insulating material (not shown) and contain conductors (hereinafter referred to) embedded in such material, or the said conductors may be insulated in any ordinary manner. The lower end 58 of the arm 59 is bifurcated, as shown in Fig. 5, so as to straddle the axle 47 and the cross-bar 63, connecting the field-magnets of the two motors, and it terminates in an expanded foot 64, which rests on powerful helical springs 65, supported by the cross-bars 25 of the motor-frame.

The car to be driven is so mounted on its trucks that a portion of its weight is borne by the springs 65, so that the weight of the car is utilized in part to insure good traction between the drive-wheels 38 and the tracks 19.

In order to protect the motors from any substance that might find its way through the conduit-slot 15, there is a shield 66, supported by the arm 59 and extending to the edge of the truck, so that anything that may fall on it is conveyed away from the working parts of the motors.

In Fig. 7 is shown a partially-diagrammatic view illustrating a switch carried by the car and the connections therefrom to the motor, whereby one or more of the sections of the field-magnets may be included in the circuit at will. The switch consists, essentially, of a segmental rack 67, to the base of which is pivoted a switch-lever 68, provided with a suitable locking-bolt 69, adapted to engage notches formed in the upper edge of the rack. To the lower edge of the rack 67 are secured a number of insulated contact-plates 70 71 72 73, and on the switch-lever is mounted a brush-block 74, arranged to make contact with the lower faces of the contact-plates by means of a spring housed in a sleeve 75, formed on the switch-lever. The contact-plate 70 is an idle plate, and when the contact-brush 74 is on this plate the circuit is broken. From the contact-plate 71 extends a conductor 71', passing down through the insulating material at one edge of the arm 59 to one of the sections 29 of the coils of the field-magnet 28, and the other terminal of which coil is connected directly to one of the brushes of the commutator of one of the motors. From the contact-plate 72 there extends a conductor 72', which is connected to the next section 29 of the field-magnet coils, which coil is in turn connected with the first-mentioned coil, as shown, and from the contact-plate 73 there extends a conductor 73', which is connected to the third section of the field-magnet coils, and this section is connected with the second section, as shown, the connections being such that the sections of the field-magnet are in series. The conductor 56', connected to the contact-brush 56, bearing on the axle 47, extends to the supporting-bracket of the switch-arm 68. In this construction when the switch-arm is moved from the idle contact-plate 70 to the contact-plate 71 the circuit is established from the conductor-track 18 through the contact-wheels 48 and the axle 47 and by the brush 56 and conductor 56' to the switch-arm 68, and from thence through the conductor 71', connected to the contact-plate 71, to the first of the sections 29 of the field-magnets, and from thence by the commutator through the armature to the drive-wheels 38 and conductor 19. When more power is desired, the switch-arm is moved to the contact-plate 72, when the circuit will be established through the conductor 72' instead of 71', and the first and second sections of the field-coils will be included in the circuit, and if the entire power of the motor is desired the lever 68 is moved to the contact-block 73, when the circuit will be established through the conductor 73' and includes all the sections of the field-magnet coils.

It will be readily understood that the field-magnets of the motors may be constructed with the coils divided into as many sections as may be desired, and that the switch will then have a corresponding number of contact-blocks.

In Fig. 8 is shown a switch-lever constructed to operate both motors—such as shown in Figs. 2 and 3—there being two series of contact-plates 70 71, &c., and two series of brushes 74, so that like sections of the field-magnets of both motors may be brought into the circuit simultaneously.

Referring now to Fig. 9, there is shown, partly diagrammatically, another arrangement of the circuits, in which the field-magnets are connected in multiple instead of series.

The segmental rack 67 and switch-arm 68 are substantially the same as that shown in Fig. 7; but in place of the brush-block 74 there is a segmental metallic brush-arm 76 secured to the switch-arm, so as to move through a curved path concentric with the lower edge of the rack 67. This arm 76 is insulated from the switch-arm and also has about one-half of the length of its upper or contact face composed of insulating material 77. On the rack 67 are a series of contact-plates 71 72 73, as in the switch shown in Fig. 7, and there are also shown two other contact-plates 78 79. These plates are all insulated from each other and from the rack and carry contact-blocks 80, which may be spring-actuated and bear on the upper curved face of the arm 76. In the drawings the switch is shown in solid lines in such position that all the contact-blocks 80 bear upon the metallic portion of the brush-arm; but if the switch be moved to the position shown in dotted lines the insulating material 77 will ride under the contact-blocks 80 and successively break the circuit at these blocks. From the contact-block 71 proceeds a conductor 71', leading to the first section of the armature-coil, the other terminal of which is connected to one of the brushes 44 of the commutator, and conductors 72' and 73' lead, respectively, to the other sections of the field-magnets, the other terminals of which sections are connected directly to the same commutator-brush; also, the conductor 56', connected with the contact-brush 56, leads to the contact-plate 78, and from the contact-plate 79 there is a conductor 79', leading to the commutator-brush 44. If, now, the switch-lever 68 be moved from the position shown in dotted lines toward the position shown in full lines, it will be seen that the contact-blocks 80 of the two contact-plates 78 79 will be bridged by the metallic upper edge of the arm 76, and the circuit through the armature will be established. In this position of the switch the motor will have very little power, since the armature will only be affected by the residual magnetism of the field. A further movement of the switch-arm will bring the contact-block 71 into the circuit, and the current will divide and in part pass through the first section of the field-magnet coils and thereby cause the motor to move with sufficient force to start the car and propel it when small power is required; but should more power be necessary a further movement of the switch-arm will bring the other sections of the field-magnet in circuit in succession, thus working up the motor to its full capacity, as will be readily understood. Where two motors are mounted on the same truck the switch will simultaneously make contact with duplicate contact-plates connected, respectively, to the two sections, as explained with relation to Fig. 8.

As has been stated above, the surface-car which is being propelled by the motors in the circuit, when resting upon the rails of the surface-track, does by its weight compress the springs 65, thus transferring a portion of the weight of the car to the motor-truck, and thereby producing the necessary traction-friction between the drive-wheels 38 and the conductors-rail 19 19. Additional traction-friction is produced by the springs 53, which force the contact-wheel 48 against the contact-surfaces of the conductor-rails 18 18. Another effect of the pressure of these springs 53 is the tendency to spread the ribs 1 1 apart and thereby keep the slot 15 open. Thus the weight of the car, acting through the straining-rods 6, co-operates with the springs 53 to effect the same result—namely, to prevent the closing of the slot 15, which is frequently experienced in electric railways where a trolley in a conduit is connected by a bar passing through a slot in the conduit with the surface-car.

Having now fully described my invention, I claim and desire to secure by Letters Patent—

1. An electric railway consisting, essentially, of a conduit arranged parallel with the surface-track and having contact-rails and an electric traction-car moving thereon, a surface-car, and an expanding mechanical connection between the same and the traction-car, whereby the required traction-friction for the latter is secured, substantially as described.

2. An electric railway consisting, essentially, of a conduit arranged parallel with the surface-track, two sets of conductor-rails in the conduit, one set of which acts as traction-rails, an electric traction-car having two sets of wheels, one for each set of rails, and receiving current therefrom, springs for forcing one set of wheels from the other and each against its rails, and a surface-car and a mechanical connection between the same and the traction-car, substantially as described.

3. An electric railway consisting, essentially, of a conduit arranged parallel with a surface-track and having contact-rails and an electric traction-car moving thereon, and a surface-car having a mechanical connection with the traction-car and being partially supported by the latter, substantially as described.

4. In an electric railway, the combination, with a conduit arranged parallel with a surface-track and containing conductor-rails, of an electric traction-car moving on the rails within the conduit, a surface-car, a mechanical connection between the traction and surface cars, and a switch on the surface-car controlling the electric traction-car, substantially as described.

5. In an electric railway, a conduit provided with ribs separated at their upper ends and independent diverging supports for the surface-tracks connected to the upper ends of the ribs, whereby the weight of a car moving on the surface-tracks will tend to further separate the upper ends of the ribs, substantially as described.

In testimony whereof I have signed my name to this specification in the presence of two subscribing witnesses.

JAMES F. McLAUGHLIN.

Witnesses:
HERBERT P. KER,
H. F. REARDON.